Feb. 19, 1963   J. L. E. MORELLE   3,077,822
CONTROL DEVICES FOR PHOTOGRAPHIC APPARATUS
Filed Sept. 20, 1960   2 Sheets-Sheet 2
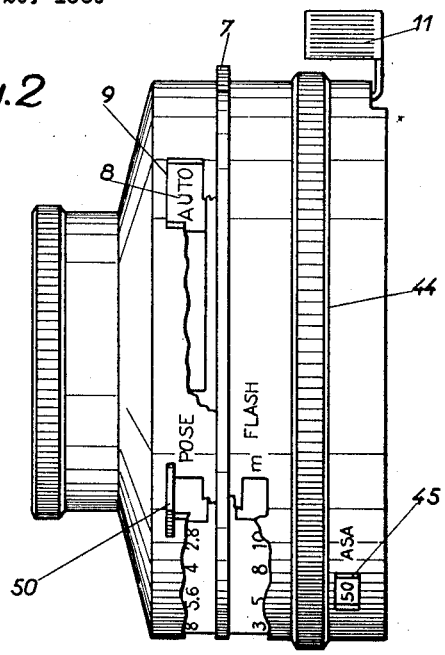
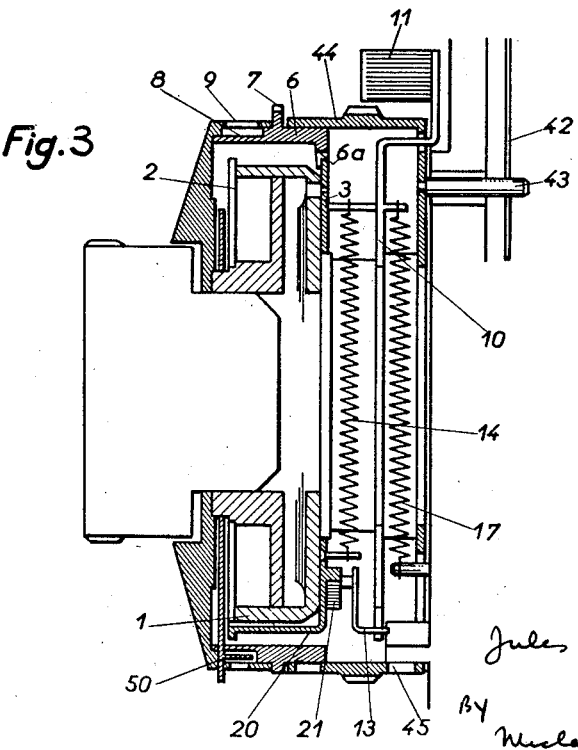

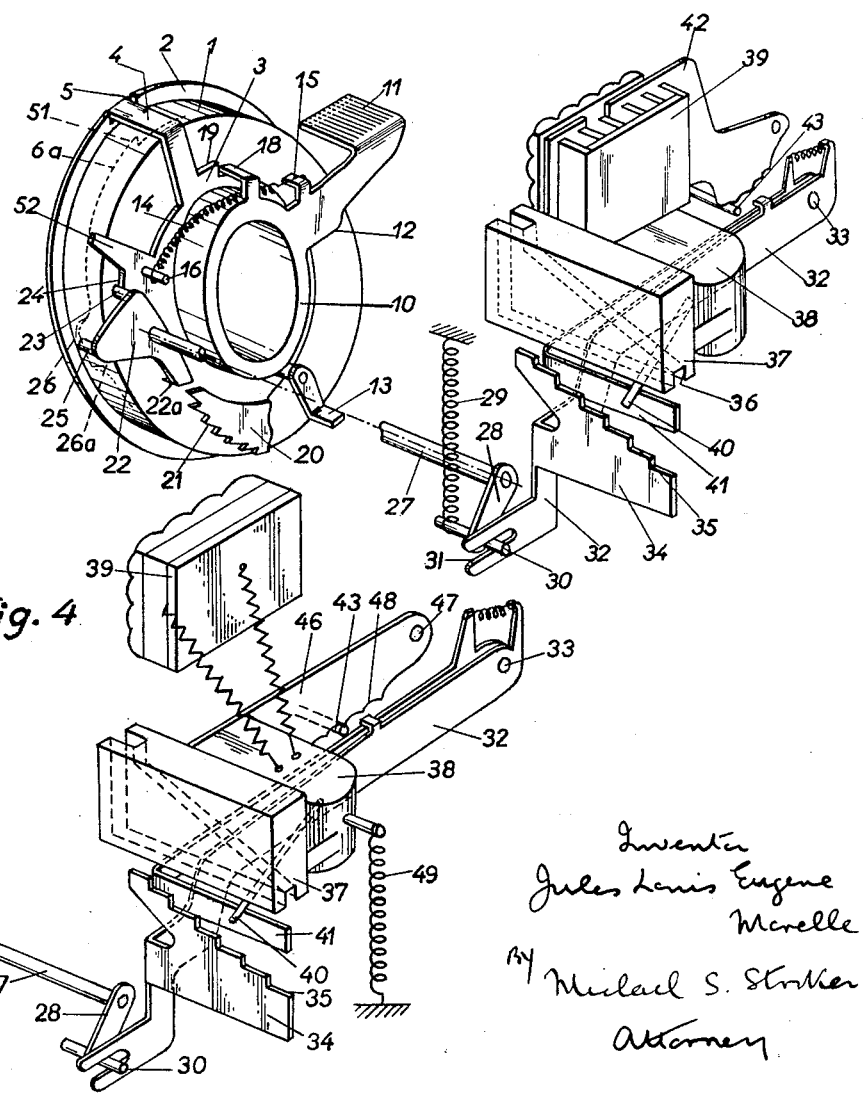

United States Patent Office 3,077,822
Patented Feb. 19, 1963

3,077,822
CONTROL DEVICES FOR PHOTOGRAPHIC
APPARATUS
Jules Louis Eugène Morelle, Paris, France, assignor to Optique et Precision de Levallois, Levallois-Perret, France, a company of France
Filed Sept. 20, 1960, Ser. No. 57,195
Claims priority, application France Sept. 28, 1959
6 Claims. (Cl. 95—10)

The present invention relates to photographic apparatus of the kind in which is incorporated an exposure meter or photo-electric cell. It has for its object a device which enables the user to dispense with any adjustment of the speed and the diaphragm opening, these two factors being automatically regulated by the exposure meter.

In accordance with one of the particular features of the invention, the devices which control the speed and the diaphragm are coupled together in such manner as to be displaced in a single movement until a stop is encountered, the position of the stop being fixed by the exposure meter as a function of the light intensity, the coupling being effected so that there is a suitable correspondence between each value of the diaphragm opening and the single value of the speed of exposure which is associated therewith.

The unit comprising the devices for controlling speed and the diaphragm opening is preferably driven in rotation by an operating knob actuated by the user, this knob continuing its movement, after the said devices have been stopped by the abutment member, the position of which is fixed by the exposure meter, so as to act on the release of the photographic shutter.

In accordance with a further particular feature of the invention, a special arrangement of the controls greatly simplifies the use of the apparatus for the exposure or flash, the transition from automatic operation to ordinary exposure for example, having the effect of locking the stop so that the latter is no longer influenced by the indication of the exposure meter.

The description which follows below with reference to the accompanying drawings (which are given by way of example only and not in any limitative sense) will make it quite clear how the invention may be carried into effect, any special features brought out either in the text or in the drawings being understood to form a part of the present invention.

FIG. 1 is a perspective view of the adjustment device according to the invention;

FIG. 2 is a side view showing the exterior of the lens-shutter unit fixed on the front of the casing of the camera;

FIG. 3 is a view in axial cross-section similar to FIG. 2;

FIG. 4 is a partial view in perspective of an alternative form of construction enabling the speed-diaphragm adjustment to be varied according to the sensitivity of the film employed.

In FIG. 1, there is shown at 1 a lens-shutter of known type which comprises principally a ring 2 carrying the exposure speed cam and a diaphragm control 3 which also has the general form of a ring.

An arm 4, one extremity of which is fixed to the diaphragm control 3 and having its other extremity engaged in a notch 5 in the exposure speed ring 2, couples together these two rings, so that one value of the speed corresponds to each angular position of the diaphragm control, that is to say a given position of the assembly of the two rings corresponds to a given value of the light intensity.

A third ring 6 or registration ring (FIGS. 2 and 3) surrounds the foregoing assembly and for the sake of clearness only a part of its inner profile 6a has been shown in dotted lines in FIG. 1. This ring, which can be operated from the exterior by a knurled segment 7, enables the apparatus to be employed on automatic operation or on exposure, depending on the angular position which is given to it, automatic operation being obtained when the corresponding indication 8 is visible in a small window 9 formed in the hood of the apparatus.

Finally, a fourth ring 10 carries an operating knob 11 on the outside of the apparatus, and provided with a heel 12 which acts on a shutter release 13 when sufficient pressure is applied to the said knob, that is to say when the ring 10 is turned through a sufficient angle.

The ring 10 is coupled to the ring 3 by a spring 14, the extremities of which are fixed on studs 15 and 16 on the two respective rings. A spring 17 (FIG. 3) restores the operating knob 11 to its upper position, at which an arm 18 fixed to the ring 10 comes into abutment against a shoulder 19 of the ring 3.

The ring 3 is fixed to a segment 20 provided with notches 21 intended to co-operate with the nose 22a of a pawl 22. The latter carries a first finger 23 which is in contact with a shoulder 24 of the ring 3, and a second finger 25 in contact with the inner profile 6a of the ring. A sloping portion 26 formed in the inner profile 6a and leading to a hollowed portion 26a causes the said pawl to pivot so as to bring it into engagement with the notches 21. In addition, the pawl carries a rod 27 parallel to its axis of rotation, at the end of which rod is fixed a crank-pin 28 controlled by a spring 29 and having its nipple 30 engaged in a slot 31 of a lever 32. This lever pivots about a shaft 33 parallel to the rod 27 and comprises a perpendicular face 34 of which one edge 35 has a profile cut in steps. When the lever 32 pivots, the edge 35 of the face 34 is engaged in a slot 36 formed in a parallelepiped body 37 rigidly fixed to a galvanometer 38 supplied from a photo-electric cell 39 incorporated in the casing of the camera. The free extremity of the needle 40 of the galvanometer moves between the parallelepiped body 37 opposite the slot 36 and a fixed plate 41, that is to say in a plane substantially perpendicular to the plane of the face 34 of the lever 32.

A shutter 42 diaphragms the cell 39 as a function of the sensitivity of the film employed. To this end, the shutter is controlled by the foot 43 of a ring 44 which records sensitivities (FIGS. 2 and 3). This ring partially encloses the casing and comprises a window 45 through which can be seen the graduations in sensitivity engraved on the casing.

FIG. 4 shows a further embodiment which enables the sensitivity of the film to act on the speed-diaphragm adjustment.

In accordance with this form of construction of the invention, the galvanometer of the exposure meter is made movable, the position of the feeler plane of the needle of the said galvanometer with respect to the stepped feeler 35 being determined by the sensitivity of the film selected. By causing the galvanometer 38 to move upwards or downwards with a resulting movement of the plane of touch of its needle 40, the abutment position of the needle on the stepped feeler 35 is displaced in height. The position of the speed-diaphragm selector pawl 22 is thereby displaced by an amount which, during the engagement of the nose 22a with the notches 21, will apply a correction to the speed-diaphragm adjustment according to the value of the sensitivity indicated.

To this end, the galvanometer 38 is fixed to a lever 46 pivoted about a shaft 47 which is coincident with the axis 33 of the feeler lever 32, or is at least in close vicinity to that axis.

The lever 46 is provided with notches forming a stepped profile 48 in contact with the foot 43 carried by the ring 44 which indicates the sensitivities. The position of the foot 43 on the profile 48 is bound up with the value of the sensitivity of the film employed. A spring 49 arranged between a fixed point and the galvanometer, constantly maintains the profile 48 in contact with the foot 43.

The profile 48 is cut in such manner that for every change in sensitivity of the film, the variation of level of the plane of the needle 40 displaces the angular position of the pawl 22, thus re-establishing the speed-diaphragm adjustment corresponding to the new sensitivity.

The simultaneous rotation of the two rings 2 and 3 coupled together by the arm 4 results in a variation of the light-intensity adjustment, which adjustment covers the range from the fully-open diaphragm and the slowest speed for the lowest intensity of light, to the partly-closed diaphragm and the highest speed for the greatest light intensity.

For each light intensity, the choice of the adjustment of the speed and of the diaphragm corresponding is therefore obtained by construction. The variation of the shutter speeds may be made continuous by the use of an appropriate speed cam, and the variation of light intensity obtained may also be continuous. However, in order to avoid too great precision of the practical construction of the mechanism, it is preferable to utilize a speed cam having a stepped profile, and in this case the variation of light intensity is carried out in steps, since the approximate adjustment obtained may be considered as adequate.

By way of indication, for a shutter covering a range of speeds from $\frac{1}{30}$ to $\frac{1}{250}$ of a second and a lens aperture from $f$ 2.8 to $f$ 22, the following law may be chosen:

| Index of light intensity | Speed | Diaphragm |
| --- | --- | --- |
| 8 | $\frac{1}{30}$ | 2.8 |
| 9 | $\frac{1}{46}$ | 2.8 |
| 10 | $\frac{1}{66}$ | 4 |
| 11 | $\frac{1}{60}$ | 5.6 |
| 12 | $\frac{1}{60}$ | 6.8 |
| 13 | $\frac{1}{125}$ | 8 |
| 14 | $\frac{1}{170}$ | 9.5 |
| 15 | $\frac{1}{250}$ | 11 |
| 16 | $\frac{1}{250}$ | 16 |
| 17 | $\frac{1}{250}$ | 22 |

In order to obtain an automatic adjustment of the exposure time, the ring 6 is first turned until the indication "Automatic" appears in the window 9, this having the effect of bringing the finger 23 into the hollowed portion 26a formed in the inside of the said ring and the pawl is then only retained by the shoulder 24 of the ring 3.

By pressing the operating knob 11, the ring 10 is caused to rotate, taking with it the diaphragm control ring 3 by means of the spring 14. The shoulder 24 leaves the finger 23 of the pawl which can then turn freely. Under the action of the spring 29, the crank-pin 28 pivots and causes the lever 32 to rotate, so that the stepped profile 35 comes into contact with the needle 40 of the galvanometer which gives the indications of the photo-electric cell 39. According to the angular position of the needle 40, one of the notches 35 comes into abutment against the needle. The position in height of the face 34 of the lever 32 determines an angular position of the crank-pin 28 and in consequence, by virtue of the rod 27, the pawl 22 takes up a corresponding angular position.

The ring 3, rotated by the knob 11, continues to rotate until one of the notches 21 of the segment 20 comes into contact with the nose 22a of the pawl 22. At this moment, the rings 3 and 2 become stationary at a value corresponding to the light intensity indicated by the galvanometer. At the end of its travel, the heel 12, directly actuated by the operating knob 11, operates the shutter release 13.

The spring 17 brings the mechanism back to its initial position as soon as the user ceases to act on the knob 11. In particular, the shoulder 24 of the ring 3 acts on the finger 23 of the pawl which pivots in such manner that it causes the profile 35 associated with the lever 32 to move downwards, thus freeing the needle 40 of the galvanometer. This latter can then pivot to give a new indication of the light intensity for the purpose of a subsequent operation.

There is thus obtained an automatic adjustment of the speed and the opening of the lens diaphragm, simply by pressing the operating knob of the shutter release.

In addition to this automatic adjustment, a special arrangement enables the camera to be utilized for ordinary exposure. To this end, a lever 50 controls the cam face which selects the exposure of the shutter. During this operation, the lever opens the indicators marked "Exposure". By rotating the ring 6, the user then registers the selected diaphragm in the exposure window. As soon as this ring leaves the automatic position, it cancels, by the finger 25 and the cam face 26, the action of the pawl 22 on the segment 20 and interposes in the path of a nose 51 carried by the ring 3, a stop 52 which limits the angular travel of the ring 3 to the value of the diaphragm indicated in the exposure window.

In addition, in the case of use of a flash, the registering ring 6 also carries a graduation in distances. The registration in the indicator marked "Flash" of the distance from the subject to the apparatus, sets the diaphragm to the correct value, depending on the type of lamp selected.

Since the "Flash" indicator is carried by the light sensitivity indicating ring 44, its displacement automatically corrects the indication of the flash, which depends on the sensitivity of the film employed.

In conclusion, it is only necessary to register the "Automatic" indication in the indicator 9, by means of the ring 7, in order that the adjustment of the exposure time may be effected automatically at each release. In the same way, the user who wishes to use the normal exposure uses the lever 50 to open the corresponding indicator and registers the selected diaphragm in that indicator. Finally, for the use of the flash with a pre-deteremined type of lamp, it is sufficient to register the distance between the apparatus and the subject in the indicator 45.

What is claimed is:

1. In a camera, in combination, a pair of coaxial rotary rings for respectively setting the exposure time and exposure aperture, said rings being connected to each other for rotation together; manually-engageable means connected to said rings so that they can be turned manually; a stepped member fixed to one of said rings for rotation therewith; adjustable stop means located in the path of movement of said stepped member; and positioning means cooperating with said stop means for automatically positioning the same at a location determined by the lighting conditions so that when said stepped member engages said stop means to be stopped thereby, the position reached by said rings will be in accordance with the lighting conditions.

2. In a photographic apparatus with an incorporated exposure meter of the needle type, comprising a speed-control ring and a diaphragm-control ring, together with a release of the photographic shutter, a device comprising a means coupling the said speed control ring to said diaphragm control ring for rotation therewith to provide predetermined combinations of exposure time and exposure aperture, means for rotating said coupled rings, movable stop means limiting the travel of said coupled rings, detection means responsive to the position of the needle of said exposure meter and coupling means between said detection means and said movable stop means in order that the position of said stop means may be determined by the exposure meter as a function of the light intensity, said detection means being constituted by a feeler which detects the position of said exposure meter needle, and said feeler having a stepped profile cooperating with a slot in front of which moves the said exposure meter needle which forms an abutment for one of the notches of the said stepped feeler.

3. In a photographic apparatus with an incorporated exposure meter of the needle type, comprising a speed-control ring and a diaphragm-control ring, together with a release of the photographic shutter, a device comprising a means coupling the said speed-control ring to said diphragm-control ring for rotation therewith to provide predetermined combinations of exposure time and exposure aperture, means for rotating said coupled rings, movable stop means limiting the travel of said coupled rings, detection means responsive to the position of the needle of said exposure meter and coupling means between said detection means and said movable stop means in order that the position of said stop means may be determined by the exposure meter as a function of the light intensity, and means for locking the stop means when it is desired to utilize the apparatus for normal exposure and enabling the diaphragm opening to be adjusted in a non-automatic manner.

4. In a photographic apparatus with an incorporated exposure meter of the needle type, comprising a speed-control ring and a diaphragm-control ring, together with a release of the photographic shutter, a device comprising a means coupling the said speed-control ring to said diaphragm-control ring for rotation therewith to provide predetermined combinations of exposure time and exposure aperture, means for rotating said coupled rings, movable stop means limiting the travel of said coupled rings, detection means responsive to the position of the needle of said exposure meter and coupling means between said detection means and said movable stop means in order that the position of said stop means may be determined by the exposure meter as a function of the light intensity, said detection means being constituted by a feeler which detects the position of said exposure meter needle, and said exposure meter comprising a movable galvanometer, the position of the plane of touch of the galvanometer needle with respect to the feeler being determined by the sensitivity of the film employed.

5. In an apparatus as recited in claim 4, said galvanometer being carried by a lever substantially perpendicular to the plane of touch of the needle, the position of said lever being determined by the position of the ring which registers light intensity.

6. In a camera, in combination, manually operable means for determining, at least in part, the extent to which film in the camera is exposed; support means supporting said manually operable means for movement, when it is actuated by the operator, along a given path; stop means movably carried by said support means adjacent said path for movement to positions in said path of movement and cooperating with said manually operable means to limit the extent of movement thereof by the operator, the position of said stop means with respect to said path thus determining the extent to which the operator can move said manually operable means; positioning means cooperating with said stop means for automatically positioning the same with respect to said path at a location determined by the lighting conditions, so that the extent to which the operator can move said manually operable means will be determined by the lighting conditions; and means cooperating with said stop means for moving the same to an operative position displaced from said path so that said manually operable means can then be positioned manually by the operator.

References Cited in the file of this patent

UNITED STATES PATENTS

| | | |
|---|---|---|
| 2,058,531 | Tuttle | Oct. 17, 1936 |
| 2,868,095 | Gebele | Jan. 13, 1959 |
| 2,923,216 | Greger | Feb. 2, 1960 |
| 2,990,758 | Sauer | July 4, 1961 |